United States Patent
Zotov et al.

(10) Patent No.: US 8,196,055 B2
(45) Date of Patent: Jun. 5, 2012

(54) CONTROLLING APPLICATION WINDOWS IN AN OPERATING SYSTEM

(75) Inventors: Alexander J. Zotov, Sammamish, WA (US); Richard J. Duncan, Kirkland, WA (US); Zoltan C. Szilagyi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 398 days.

(21) Appl. No.: 11/275,798

(22) Filed: Jan. 30, 2006

(65) Prior Publication Data

US 2007/0180400 A1    Aug. 2, 2007

(51) Int. Cl.
*G06F 3/048* (2006.01)
(52) U.S. Cl. .......... 715/764; 715/788; 715/800
(58) Field of Classification Search .......... 715/764, 715/788, 798, 799, 800
See application file for complete search history.

(56) References Cited

U.S. PATENT DOCUMENTS

| | | | |
|---|---|---|---|
| 6,636,244 B1 * | 10/2003 | Kelley et al. | 715/781 |
| 7,028,264 B2 * | 4/2006 | Santoro et al. | 715/765 |
| 7,519,573 B2 * | 4/2009 | Helfman et al. | 1/1 |
| 2002/0083097 A1 * | 6/2002 | Warrington | 707/513 |
| 2002/0140742 A1 * | 10/2002 | Lection et al. | 345/835 |
| 2003/0065505 A1 * | 4/2003 | Johnston et al. | 704/9 |
| 2004/0027392 A1 * | 2/2004 | Dunn et al. | 345/810 |
| 2004/0240739 A1 * | 12/2004 | Chang et al. | 382/186 |
| 2006/0077183 A1 * | 4/2006 | Studt | 345/173 |
| 2006/0277460 A1 * | 12/2006 | Forstall et al. | 715/513 |
| 2007/0162865 A1 * | 7/2007 | Haynes et al. | 715/769 |

* cited by examiner

*Primary Examiner* — Chat Do
*Assistant Examiner* — Phenuel Salomon
(74) *Attorney, Agent, or Firm* — Lee & Hayes, PLLC

(57) ABSTRACT

Systems and methods are provided for controlling the appearance of application windows on a computer display screen. A user identifies either an application window currently running on the computer or a new application to be started. The user also identifies a size, shape, and screen location by inputting a geometric shape, such as by drawing a rectangle with a pen or stylus input device, on the display screen. The appearance of the application window is set based on the geometric shape. The application window is resized and moved, for a currently running application, or created, for a new application, on the display screen.

15 Claims, 5 Drawing Sheets

CONTROLLING APPLICATION WINDOWS IN AN OPERATING SYSTEM

BACKGROUND

Computer operating systems commonly allow the customization of application windows on the display screen. Users may minimize, maximize, tile, or control the size and screen location of the windows of the different applications currently running on their computer. These techniques are often designed for ease of use and compatibility with commonly used computer input devices, such as a mouse and keyboard. For example, window resizing may commonly be done by a user by hovering the mouse cursor over a small designated target location at a corner of the application window to be resized. The user then presses and holds the mouse button and then drags the mouse to resize the application window, setting a different size and shape for the window. Similarly, many computer operating systems allow users to move application windows around the display screen by mouse-clicking on a different specific target location on the application window, and then dragging the window to a different location.

As computer operating system input devices have evolved, pen input devices have become common tools for interacting with operating systems on tablet personal computers (tablet PCs), personal digital assistants (PDAs), and similar pen-supported computing devices. Pen input devices are pointed writing instruments which allow users to "draw" on their computer screen as though they were writing with an ink pen on a piece of paper. For example, a pen input device may be an electromagnetic digital pen compatible with certain tablet PCs, or it may be a simple touch pen or stylus compatible with certain tablet PCs and many PDAs having touch digitizers. A pen input device may also support taps and drags to perform the same functions as a mouse does performs with clicks and drags. Thus, in a tablet PC or any device with which a pen input device may be used rather than or in addition to a mouse, users commonly move and resize application windows using taps and drags, similar to the way that a mouse user might perform these operations.

However, operating system tasks such as these, which were originally designed for mouse input devices, may potentially be more difficult to perform with pen input devices, since subtle movements such as taps or drags into small target areas may require greater motor control. Additionally, pen input targeting errors may result when a user holds a pen at an angle, electromagnetic interference may affect a digitizer's electromagnetic field, and the pen input might not be accurately calibrated to the digitizer. These and other potential problems may cause many operating system tasks to be less reliable or more tedious with a pen input device. Thus, in current operating systems, using a pen input device to resize or reposition application windows may be considerably more difficult than using a mouse to perform the same tasks.

As PDAs and tablet PCs with pen input devices have gained in popularity, some efforts have been made to improve the usability of pen input devices with respect to such tasks as window resizing and repositioning. In one attempt, the target area that the user taps on the display screen to resize a window was made larger to allow users to more easily tap that area and resize the window. However, solutions such as this unnecessarily waste valuable limited space on the display screen, which for devices such as tablet PCs or PDAs may already be smaller then standard display screens. This problem is further compounded when a user has many application windows open concurrently on the screen.

SUMMARY

The following presents a simplified summary of the invention in order to provide a basic understanding of some aspects of the invention. This summary is not an extensive overview of the invention. It is not intended to identify key or critical elements of the invention or to delineate the scope of the invention.

The following summary merely presents some concepts of the invention in a simplified form as a prelude to the more detailed description provided below.

Various illustrative aspects of the present invention are directed to controlling the appearance of an application window on a display screen. A user may designate an existing application window and may then input a geometric shape, such as by drawing a rectangle on the screen with a digital pen input device. The operating system may then automatically resize and move the existing application window to the screen location determined by the rectangle. The geometric shape may also include, for example, a diagonal line representative of a rectangle of a new application window in which to establish the moved and resized application window.

According to another aspect of the present disclosure, a user may start a new application in a chosen location. The user may draw a geometric shape on the display screen and then input an application name, for example, by drawing a rectangle on the screen with a pen input device and then writing an application name with the pen inside the rectangle. The operating system may recognize the application name, then start the new application and draw a new application window, using a size, shape, and screen location based on the user-drawn rectangle (or other shape). The user may also identify the new application to be started by using a start menu, run dialog, radial menu, word wheel dialog, or similar technique. In yet another aspect of the present disclosure, an application window may be configured to run in a minimized or maximized state, or may be closed, by receiving other geometric shapes drawn by the user predefined to invoke operating systems commands for minimizing, maximizing, invoking a help dialog box, and closing application windows.

According to another aspect of the present disclosure, a window definition mode may be initiated by a user to allow the operating system to better interpret the intended purpose of geometric shapes drawn on the screen. Window definition mode may be initiated, for example, by a physical button positioned on a pen input device or tablet PC. This mode may allow a user to draw shapes on the screen overlapping existing application windows, for example, to move an existing application window or to create a new application window, without affecting the operation of the underlying window. Thus, window definition mode may allow the operating system to distinguish between user actions intended to interact with a specific application window, and user actions intended to move, resize, or create a new application window. Window definition mode may alternatively be instantiated using a soft button or control displayed on the display screen, or by performing a gesture, such as a "flick" with a pen input device.

BRIEF DESCRIPTION OF THE DRAWINGS

Figure 1:
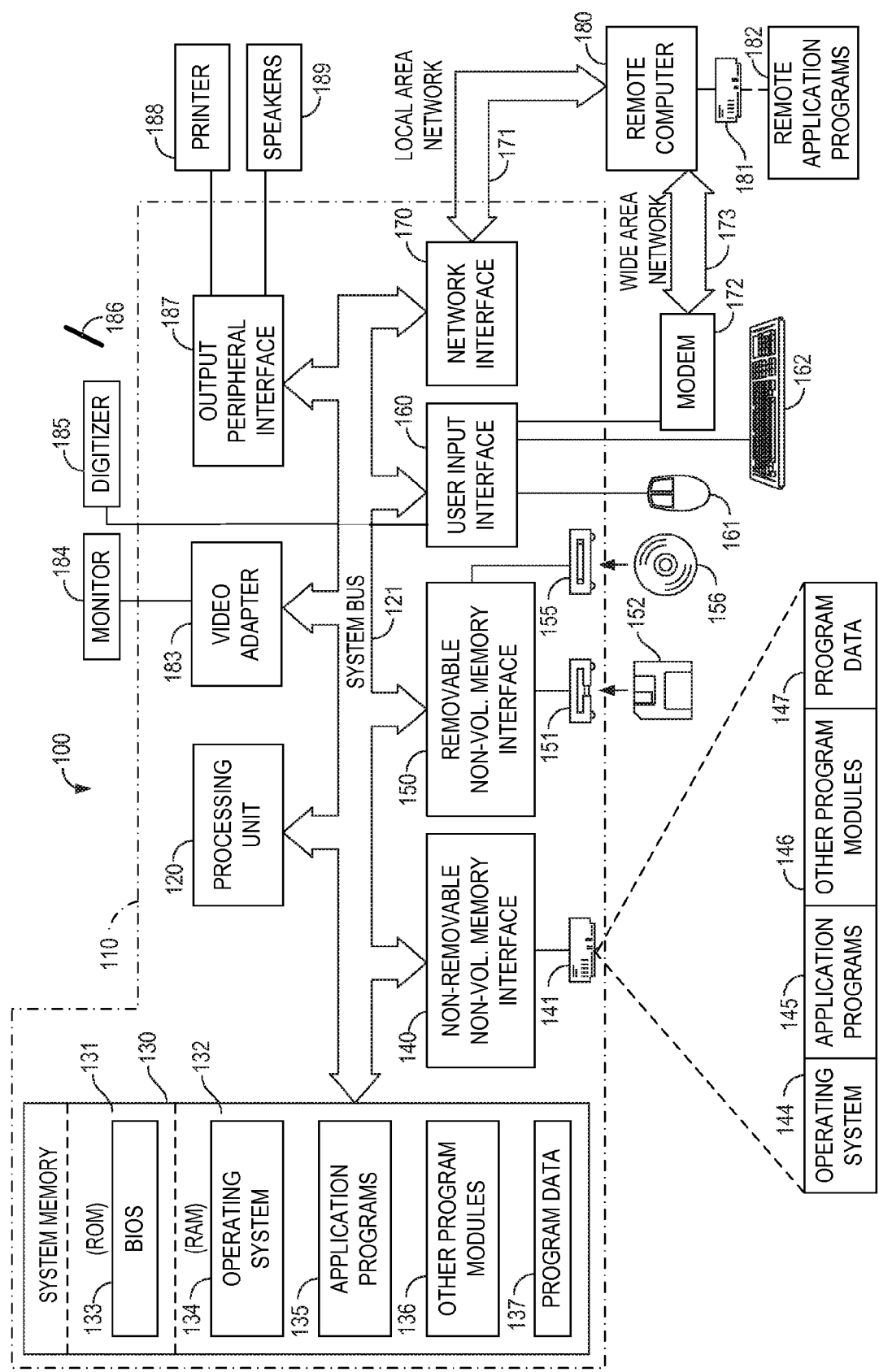
Figure 2:
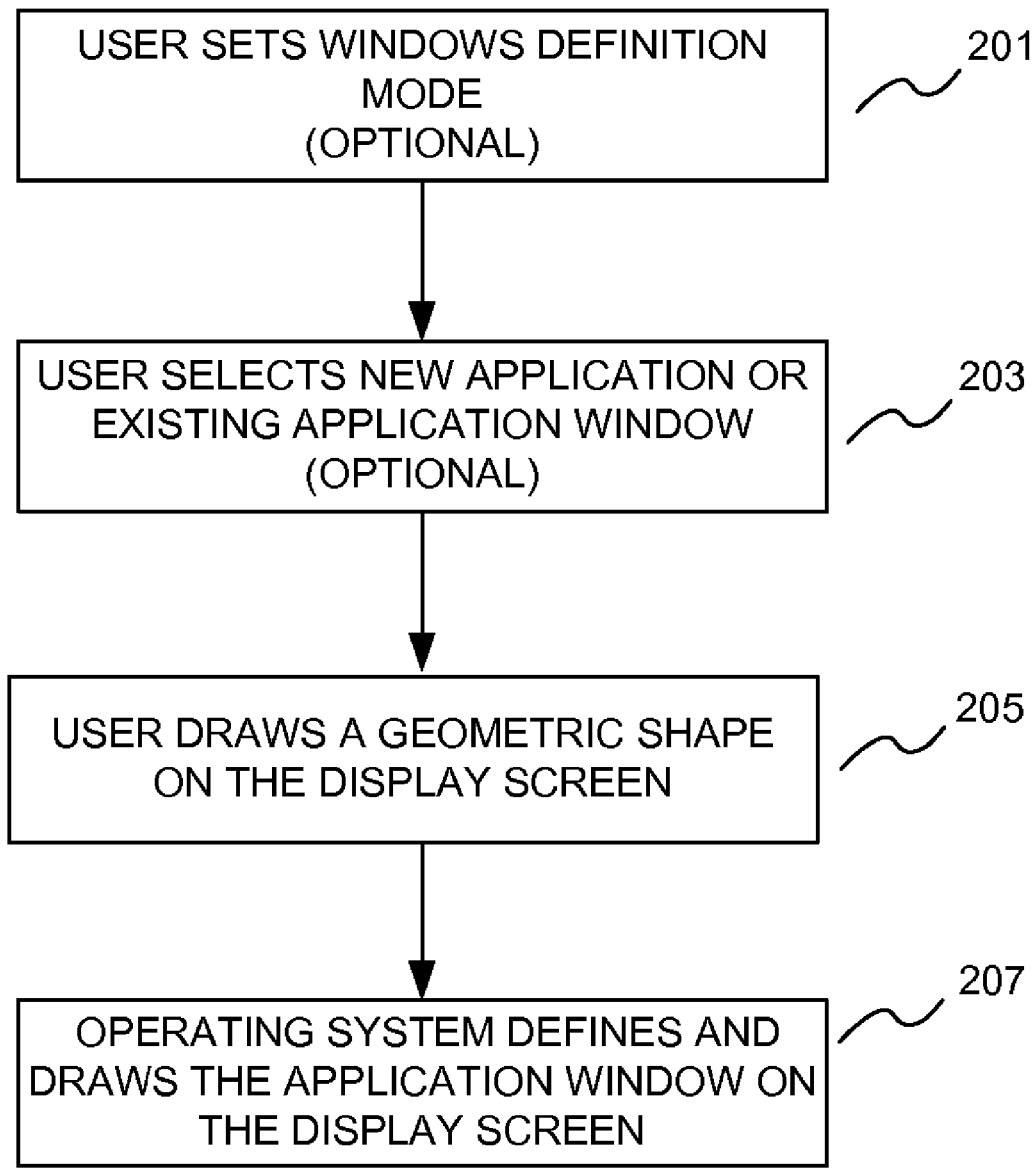
Figure 3A:
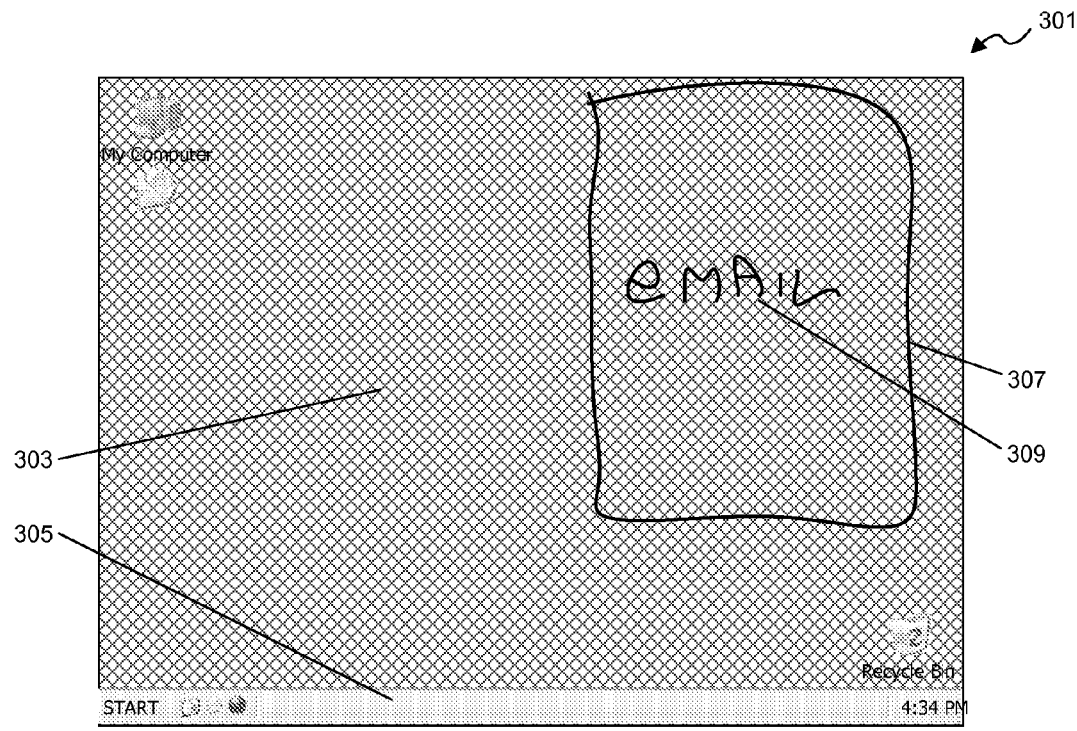
Figure 3B:
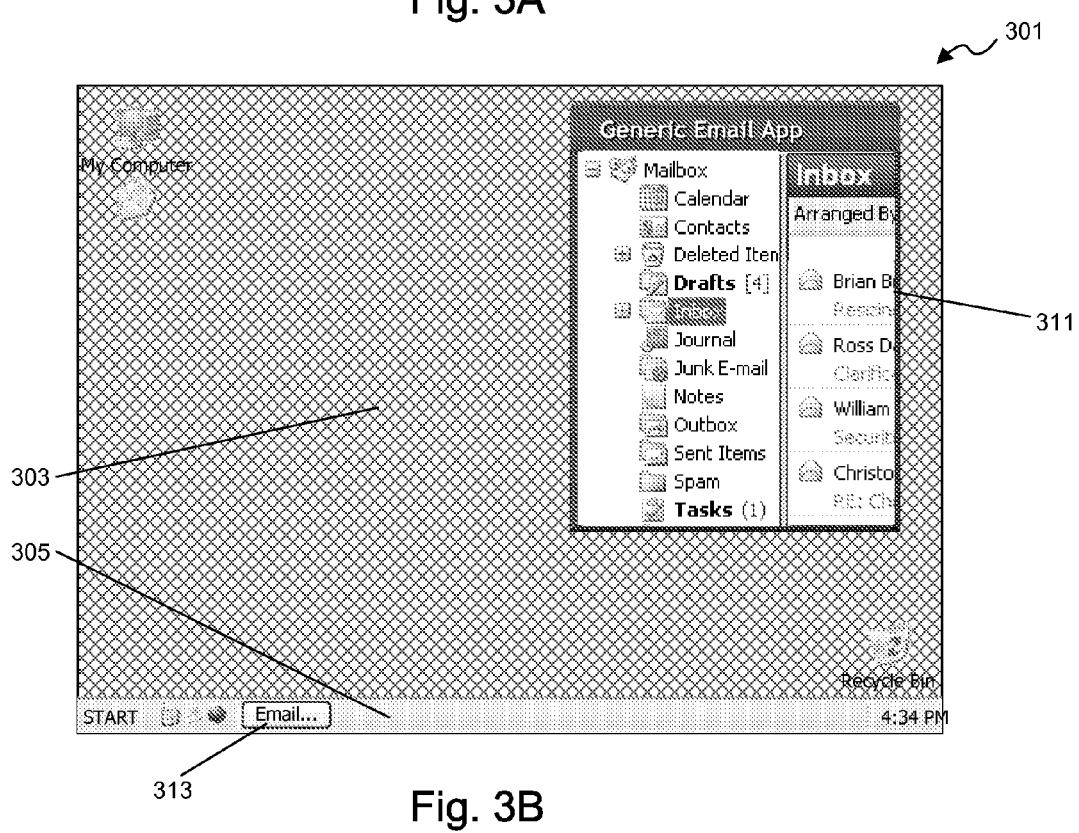
Figure 4A:
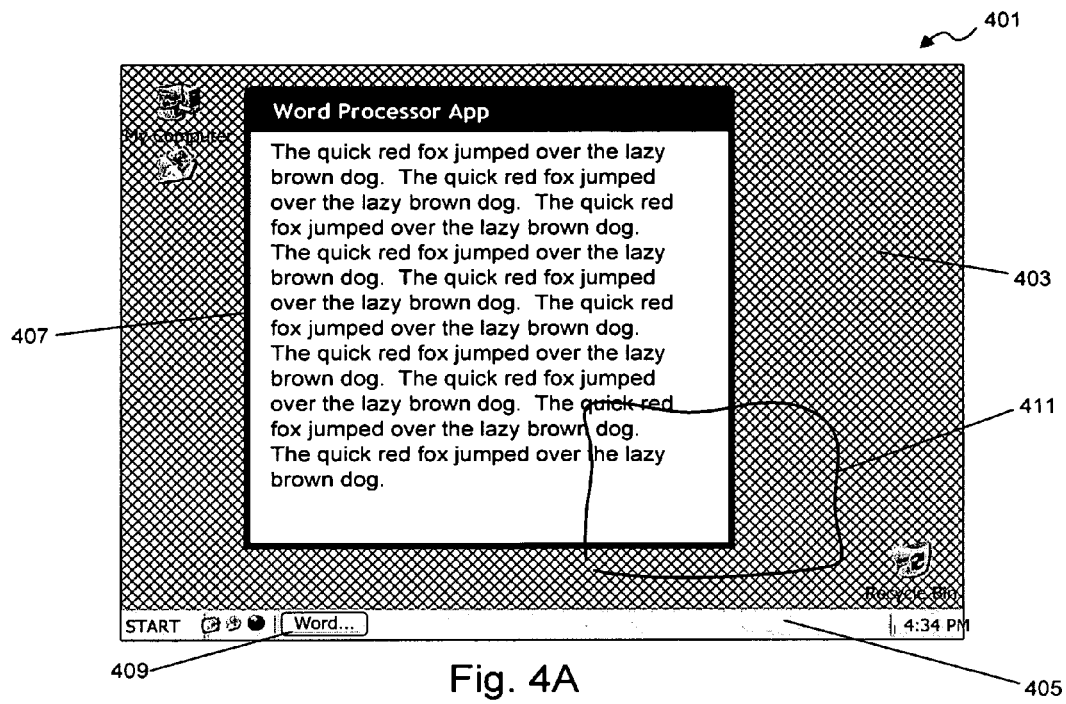
Figure 4B:
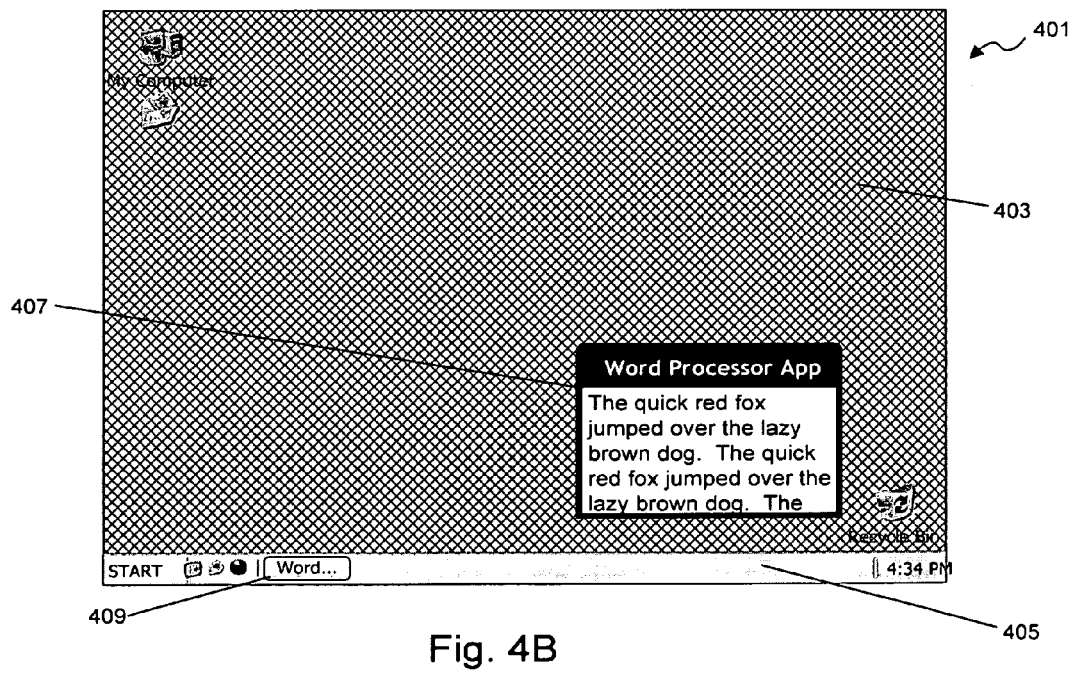
Figure 5:
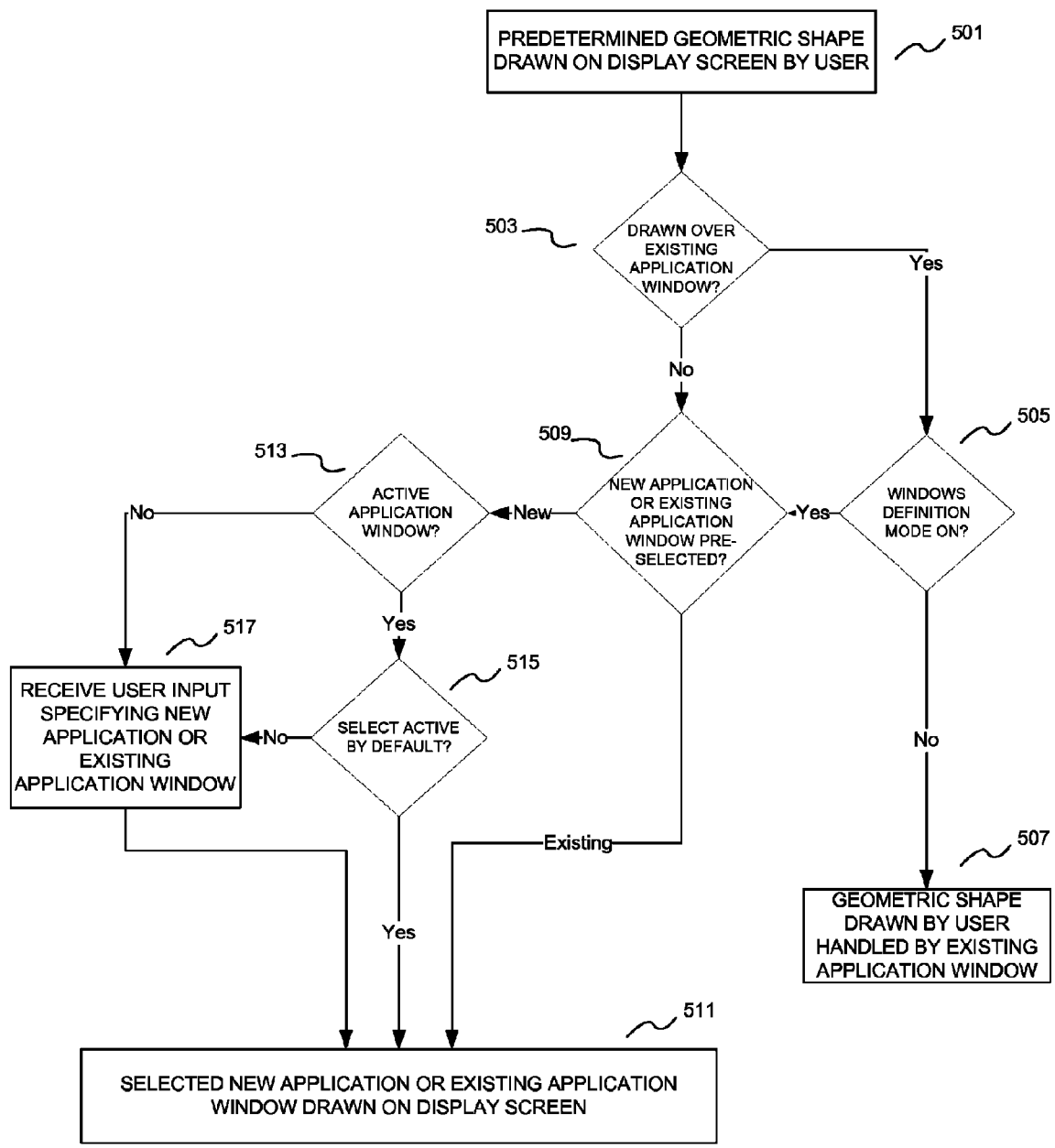

Having thus described the invention in general terms, reference will now be made to the accompanying drawings, which are not necessarily drawn to scale, and wherein:

FIG. 1 is a block diagram illustrating an operating environment in which one or more illustrative embodiments may be performed;

FIG. 2 is a flowchart showing illustrative user steps for defining the appearance of an application window in a display screen;

FIG. 3A illustrates a screen shot showing a method for instantiating a new application and defining the appearance of an associated application window on a display screen according to one or more illustrative aspects;

FIG. 3B illustrates a screen shot showing a new application window on a display screen resulting from the methods illustrated in FIG. 3A;

FIG. 4A illustrates a screen shot showing a method for changing the screen appearance on an existing application window on a display screen according to one or more illustrative aspects;

FIG. 4B illustrates a screen shot showing a new appearance for an existing application window resulting from the methods illustrated in FIG. 4A; and FIG. 5 is a flowchart showing illustrative decision-making steps for drawing an application window on a display screen according to one or more illustrative aspects.

DETAILED DESCRIPTION OF ILLUSTRATIVE EMBODIMENTS

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention Illustrative Operating Environment FIG. 1 illustrates an example of a suitable computing environment 100 in which the invention may be implemented. The computing environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers; server computers; portable and hand-held devices such as personal digital assistants (PDAs), tablet PCs or laptop PCs; multiprocessor systems; microprocessor-based systems; set top boxes; programmable consumer electronics; network PCs; minicomputers; mainframe computers; game consoles; distributed computing environments that include any of the above systems or devices; and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an illustrative system for implementing the invention includes a general purpose computing device in the form of a computer 110. Components of computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Advanced Graphics Port (AGP) bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, DVD or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/ nonvolatile computer storage media that can be used in the exemplary operating environment include, but are not limited to, magnetic tape cassettes, flash memory cards, DVD, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port, universal serial bus (USB), or IEEE 1394 serial bus (FireWire). At least one monitor 184 or other type of display device may also be connected to the system bus 121 via an interface, such as a video adapter 183. The video adapter 183 may support advanced 3D graphics capabilities, in addition to having its own specialized processor and memory. Computer 110 may also include a digitizer 185 to allow a user to provide input using a stylus or other pen input device 186. In addition to the monitor, computers may also include other peripheral output devices such as speakers 189 and printer 188, which may be connected through an output peripheral interface 187.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 may be connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 182 as residing on memory device 181. It will be appreciated that the network connections shown are exemplary and other means of establishing a communications link between the computers may be used.

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Illustrative Embodiments

Illustrative embodiments described herein may aid a user to define a window size, shape, and/or location by drawing an approximation of a new window size on a display screen, e.g., using a stylus or pen input device. Although the illustrative embodiments described in these examples often refer to a tablet PC with a connected pen input device, the present disclosure is not limited to such uses. PDAs, laptop or desktop PCs, and any other device with a windowing system, such as, for example, a graphical computer operating system, may take advantage of the methods disclosed herein to define and change the appearance of application windows on the display screen of a computer. For example, a PDA using a stylus, a tablet PC using touch and/or pen input, or a desktop computer connected to a mouse and keyboard may employ the advantages of the present disclosure to identify new or existing application windows and draw geometric shapes on the display screen of the device in order to change the appearance of these application windows.

Referring to FIG. 2, a flowchart is shown illustrating steps that a user may take to define the appearance of an application window in a display screen. The steps of FIG. 2 may be performed, for example, on a tablet PC when a user wants to customize the appearance of one or more application windows on the display screen. For example, a user may want to move or resize an existing application window, or to create a new application instance while defining the size and location of the new application window corresponding to this new application.

In step 201, the user of a computer may put the computer into a window definition mode. A window definition mode is a mode in which the operating system or user interface controller is explicitly expecting input through which a user can perform a function related to resizing, moving, or creating an application window. As is indicated in FIG. 2, this step may be optional. In many embodiments, it may be possible to identify an application and specify a desired region on the display screen without needing to initiate a designated window definition mode. For example, if a user draws a rectangle on the empty desktop of a computer with no currently running applications, then the operating system may be able to unambiguously determine that the user intends to create a new application window at the specified location. In a contrasting example, a user may draw a geometric shape or symbol on top an existing application window, so that the operating system may not be able to unambiguously determine whether the user intends to place a new application window on top of an existing application window or to merely interact with the application currently running in the window. Thus, in this example, a window definition mode may potentially provide the advantage of allowing a user to place an application window on top of an existing application window, without the operating system interpreting the user-drawn symbols as an attempt to interact with the existing application.

In embodiments that use a designated window definition mode, this mode may be initiated by a user action before identifying the application to be moved, resized, or created, and before drawing a rectangle or other indicia to describe the shape for the new application window. A user may initiate this mode by, for example, pushing a button positioned on the outside of the pen input device, pushing a button positioned on the outside of the computer itself, inputting a predefined gesture using the pen input device, or any other predefined input, to toggle window definition mode on and off. In certain embodiments, window definition mode may be initiated and disengaged using operating system commands, such as, for example, clicking an icon in the Start Menu, Task Bar, or Quick Launch Menu of a Microsoft Windows® operating system, or by interacting with a dedicated Control Panel user interface.

In step 203, the user may identify the application whose window is to be manipulated (i.e., placed, moved, resized, etc.) on the display screen. An application may be an application currently running on the computer, or a new application that the user intends to start or launch. Therefore, identifying an application may simply involve the user selecting an application window from among the application windows visible on the screen. In certain embodiments, the user need not perform any action at this step, because the operating system may select a new application or existing application window according to predefined system or user preferences. For example, the operating system may be configured to designate the currently active, foreground, or in-focus, application as the target of the moving/resizing function. Alternatively, the user may select a new application to be started, or instantiated, from among any of the applications, or programs, installed on the computer. For example, step 203 may involve a user selecting an application to run from the Start Menu, or typing or writing an application name into a Run dialog box, a word wheel dialog box, or on the screen of the computer.

Additionally, as is described below, a user might not identify an application to move, resize, or create until after drawing a geometric shape to describe the region of the display screen to be used for the associated application window. For example, in certain embodiments a user may first draw the desired shape onto the screen, then identify the application, while in other embodiments the user may first identify an application, then draw the shape on the screen to place that application.

In step 205, the user may draw a geometric shape, such as a rectangle, on the screen to indicate the size, shape, and screen location where the application window associated is to be placed. As is shown in FIGS. 3A and 4A, and as is commonly understood in the field of tablet PCs, pen input devices, and related technologies, the rectangle drawn by the user might not be a perfectly geometric rectangle but instead may be a symbol substantially similar to a rectangle so that the operating system of the computer may recognize the symbol as an intended rectangle and may determine a size, shape, and screen location based on the symbol. For example, the maximum, minimum, or average height of the drawn rectangular symbol may be used as the height of the application window to be drawn, the maximum, minimum, or average width of the rectangular symbol may be used as the width of the application window to be drawn, and the geometric center of the rectangular symbol (or some other predefined location or feature of the shape) may be used to define the screen location of the application window to be drawn.

In other embodiments, the user may draw a circular symbol, a diagonal line (e.g., representing a diagonal of a rectangular shaped window), or any predetermined symbol from which the operating system can calculate an intended appearance for the application window to be drawn. Even if the application window itself is not rectangular, a rectangle or other user-drawn shape may still be used to define the size, shapes, and location of the application window. In certain embodiments, the user may also draw predefined symbols to indicate that the application window should be minimized, maximized, or closed. For example, a vertical line drawn upwards or an upward "flick" motion (or other gesture) with a pen may indicate that the selected new or existing application window should be maximized on the display screen. Similarly, a vertical line drawn downwards or a downward flick may indicate that the selected new or existing application window should be minimized. An "X" may indicate that the selected existing application window should be closed, while a question mark drawn over a window may indicate that a help dialog based on the application and application state should be invoked. Such examples illustrate yet another potential advantage of the present disclosure, namely that a user may potentially create a new application instance that is initially displayed in a minimized or maximized state, rather than being displayed in a portion of the desktop region of the screen, as is a common default behavior in many computer systems. Further, a window definition mode may be used for other windowing commands, such as close, help, minimize, maximize, and other predetermined operating system commands, such as commands associated with specific pen gestures.

Finally, in step 207, the operating system may determine the intended user action and may update the display screen, placing the application identified in step 203 on the screen, using the size, shape, and/or screen location determined in step 205.

Referring to FIG. 3A, a screen shot is shown illustrating a method for instantiating a new application on a computer. The desktop region 303 of the display screen 301, a common feature of graphical operating systems, is the region of the display screen 301 not in use by an application window. FIG. 3A illustrates a computer with no currently running applications. Thus, the desktop region 303 takes up the bulk of the display screen 301, and no application windows are present on the desktop 303 or are indicated by application icons in the task bar region 305.

In this example, the user has drawn a rectangle 307 in an unused area of the desktop region 303 with a pen input device. The user has also written the word "EMAIL" 309 inside the rectangle 307. The order of these two user actions may be reversed while still preserving the advantages described herein. That is, in certain embodiments, the user may draw the rectangle 307 before writing the application name 309 inside of it, while in other embodiments the user may write the application name 309 on the desktop before drawing a rectangle 307 around it.

Once the rectangle 307 and the application name 309 have been written by the user, the operating system of the computer may then interpret these symbols to determine first that the rectangular symbol 307 indicates that the user intends to create a new application window in this area of the screen. Secondly, the operating system may resolve the handwritten application name 309 into the word "Email" and may determine an application to start based on this word. In this example, the word Email indicates that the user intends to start an instance of the default electronic mail application installed on the computer. Thus, this example further illustrates a potential advantage of such an embodiment, that writing a word with a pen input device may be faster and easier for a user than searching through a program hierarchy and selecting the desired application.

Thus, turning to FIG. 3B, the operating system of the computer has started the "Generic Email App" and drawn an application window 311 on the display screen 301, having generally the same size, shape, and screen location as the user-drawn rectangle 307. The rectangle 307 and the writing 309 are no longer displayed on the screen. Additionally, since a new application was started on the computer, an icon 313 associated with the new application window 311 now appears in the task bar region 305.

Referring to FIG. 4A, another illustrative screen shot is shown illustrating a method for moving an existing application window in a computer. The desktop region 403 of the display screen 401 contains one application window 407 running the "Word Processor App." An icon 409 corresponding to application window 407 is shown in the task bar region 405 of the display screen 401. The user in this example may want to keep application window 407 visible, but may want to make the window 407 smaller and change its location. In this example, optionally after entering the window definition mode, the user has drawn a rectangle 411, partially overlapping the application window 407. The user may then designate that the Word Processor App window 407 should be resized and moved into the area of rectangle 411. As discussed above, this designation may occur prior to the user drawing the rectangle on the screen, or after the rectangle is drawn, or may occur automatically based on predefined system or user preferences. For example, the Word Processor App window 407 may be chosen automatically because it was the active application window when the user initiated window definition mode, just before drawing the rectangle. In another example, the Word Processor App window 407 may be chosen according to a predefined user preference stating that whenever the drawn rectangle overlaps exactly one application window, that application window is automatically selected to be resized window. Such user preferences may be created and stored by individual users, or may be available as operating system defaults that can be turned on and off by users.

As previously noted, unlike the example illustrated in FIGS. 3A and 3B, the geometric shape 411 overlaps the existing application window 407. While this does not in any way prohibit the user from creating a new application in this space, or moving an existing application window to this space, it may be advantageous in certain embodiments to require the user to initiate the window definition mode before drawing the rectangle 411. Certain applications may be configured to accept pen strokes as input and shapes drawn by the user in the application window, for example, a drawing application or a note taking application running on the computer. Thus, the window definition mode may permit the operating system to unambiguously determine whether the user intends to draw within the current application window, or intends to move, resize, or create an application window in that area. In certain embodiments, other information, such as the type of shape drawn, the timing of each pen stroke, the extent to which the shape overlaps the existing application window, and the type of application running in the window may also be used by the operation system to determine, perhaps even without the use of a window definition mode, whether or not the user intends to perform a windows definition function, rather than to interact with an existing application window.

In FIG. 4B, the Word Processor App window 407 has been moved and resized to the position defined by the user-drawn rectangle 411. The rectangle 411 is no longer displayed on the screen, and the user or system may now disengage window definition mode. In certain embodiments, window definition mode may be disengaged automatically after a new window is created or after an existing window is moved or resized, since there may be a likelihood that the user's next task might not be a windows definition task, but rather a standard interaction with the operating system or one of the application windows.

An additional potential advantage of the present disclosure is illustrated in FIGS. 4A and 4B. In many current systems, resizing an application window and changing the screen location of an application window are completely separate tasks that must be accomplished by two distinct user operations. As illustrated above, the present disclosure may allow users to both resize and relocate an existing application window in one operation.

Referring to FIG. 5, a flowchart is shown illustrating part of the decision making process that the operating system may undertake after a user draws a rectangle or other geometric symbol on the display screen. As discussed above, user input, such as symbols drawn on the screen with a pen input device, may be intended for a specific application rather than for a windows definition function, that is, rather than to move, resize, or create an application window. Thus, the operating system may first attempt to determine whether the user intends to perform a windows definition function, rather than merely interacting with an existing application. Then the operating system may determine which application window the user is attempting to move, resize, or create, and may define and draw that application window on the display screen as determined by the rectangle or other geometric shape drawn by the user.

In step 501, the user draws a geometric shape, such as a rectangle, somewhere on the display screen. The operating system may receive this user input in step 503 and may initially determine whether or not the rectangle overlaps any existing application window on the display screen. If this shape does overlap an application window, then in step 505 the operating system may check to see if the user has initiated window definition mode prior to drawing the rectangle. If the user has not initiated window definition mode, then the operating system may quickly conclude that the input drawn on the screen is not an attempt by the user to move, resize, or create a new application window, and may therefore allow the application in the underlying application window to handle this user input in step 507.

However, if the rectangle was drawn directly onto the desktop and does not overlap an existing application window, or if the user has initiated a window definition mode, then the operating system may conclude that the user does intend to perform a windows definition function. In step 509, the operating system may determine whether the user has predefined an application for the drawn application window space. As discussed above, in certain embodiments, the user may predefine an existing application window by tapping or otherwise selecting the application window after initiating window definition mode. Similarly, the user may predefine a new application instance by, for example, writing the application name on the screen before drawing the rectangle. In another example, certain embodiments allow a computer to be configured to so that an application window will not immediately be drawn on the screen after a user selects a program from a start menu, launch menu, run dialog box, word wheel dialog box, or similar program launching technique. Instead, the computer may wait until the user draws a rectangle before drawing the application window corresponding to the new application.

If the user has predefined an existing application window or new application instance, then the existing or new application window can be drawn on the screen in step 511. As discussed above, the size, shape, and screen location of the application window may be based on the size, shape, and screen location of the rectangle drawn by the user.

If no application has been predefined, or in embodiments where predefined applications are not supported, the operating system may then take steps to determine which existing application window or new application instance should be placed in the rectangle. In step 513, the operating system may determine if there is a currently active application window on the display screen. If so, and if the operating system determines in step 515 that the computer is configured to select the active application window for use in this windows definition task, then the active window will be resized and moved to the screen location of the user-drawn rectangle in step 511.

In step 517, there is either no active application window, or the computer is configured so that the active application window is not automatically selected for window resizing. Thus, the operating system may now solicit user input to determine which application window or which new application instance should be drawn in the rectangle. This step may be accomplished by allowing to user to tap or otherwise select a currently running application window. For example, the user may tap an area on an application window drawn on the desktop region, or may choose an application window by selecting its associated task bar icon. Alternatively, the operating system may determine that the user intends to start a new application in the rectangle, and may create a dialog box or word wheel to enable the user to input and select the desired program name. The user may also have the option of selecting a program from the start menu or writing the application name on the screen, for example, inside the rectangle as shown in FIG. 3A. Finally, once the operating system has concluded which existing application window or new application instance has been selected by the user, the operating system can resize and/or move the existing window, or create the new window, at the screen location determined by the rectangle in step 511.

The method illustrated in FIG. 5 represents one possible algorithm or set of heuristics that may be used to determine user interaction with a computer system configured as described herein. Other algorithms, heuristics, and/or logic may alternatively be used to accomplish the same or similar tasks. Additionally, the steps of FIG. 5 may be reordered, and one or more steps may be optional. Some steps may be combined or split up depending on the specific implementation desired.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for changing the appearance of an application window of a currently running application on a display screen of a computer, the method comprising:
   receiving a first user input identifying the application window of the currently running application;
   initiating a window definition mode on said computer to enable the operating system to define a size and a location of the application window prior to receiving a second user input;
   while said computer is in the window definition mode, detecting by the operating system a geometric shape drawn on said display screen, wherein the detecting is handled by the operating system and not handled by the application associated with said application window, said geometric shape drawn by a user with a touch input device, wherein the geometric shape comprises a rectangle, and wherein drawing of the geometric shape drawn on the display is started in an area free from any running application, and wherein the geometric shape is drawn on any portion of the display screen which includes an area inside at least one application window and outside of the at least one application window;
   receiving a second user input describing a configuration of the application window associated with said currently running application on the display screen, wherein said second user input comprises a symbol drawn on the display screen by the user;
   changing, by the operating system, the size and the location of the application window based on the geometric shape and changing the appearance of the application window associated with said currently running application on the display screen based on the symbol; and
   establishing and operating the currently running application by the operating system in said application window having a changed appearance on the display screen.

2. The method of claim 1, wherein the rectangle is defined by a line which defines opposite corners of the rectangle which forms a new window for the application window.

3. The method of claim 2, wherein the line is not drawn over any portion of an existing application window while said computer is in a window definition mode.

4. The method of claim 1, wherein said second user input comprises a predetermined symbol drawn on the display screen via the touch input device, and wherein said symbol is associated with an operating system command to maximize said application window.

5. The method of claim 1, wherein said second user input comprises a predetermined symbol drawn on the display screen via the touch input device, and wherein said symbol is associated with an operating system command to minimize said application window.

6. The method of claim 1, wherein said second user input comprises a predetermined symbol drawn on the display screen via the touch input device, and wherein said symbol is associated with an operating system command to close said application window.

7. The method of claim 1, wherein said first user input comprises tapping via the touch input device the application window associated with the currently running application while said computer is in a window definition mode.

8. An apparatus comprising a storage medium with instructions stored therein, the instructions when executed causing a computing device having a display screen to perform acts comprising:
   receiving a first user input describing a target application, wherein the target application is not yet running;
   initiating a window definition mode on said computing device to enable an operating system of the computing device to define the size and location of an application window prior to receiving a second user input, wherein while said computing device is in this mode, any geometric shape drawn on said display screen over an application window is not handled by the application associated with said application window, but by the operating system;

receiving by the operating system a second user input comprising a line for forming a rectangle drawn on said display screen of the computing device, said line drawn by a user with a touch input device, wherein the line defines opposite corners of the rectangle which forms the application window, wherein the line is drawn on any portion of the display screen which includes an area inside at least one application window and outside of the at least one application window, the second user input further comprising an application name written inside said rectangle by the user;

determining by the operating system a size and screen location of the application window based on said forming the rectangle drawn comprising selecting a size and a screen location for the application window based on the size and the screen location of said forming the rectangle drawn; and establishing and operating the target application by the operating system in said application window on the display screen.

9. The apparatus of claim 8, wherein said computer input device comprises a touch input device, and wherein the line is drawn over an area of the display screen free from any application window while said computing device is in the window definition mode.

10. The apparatus of claim 8, wherein initiating said window definition mode comprises receiving a third user input, said third user input comprising pressing a designated window definition mode button.

11. The apparatus of claim 8, wherein the first user input includes a touch input to the display screen.

12. A method for defining a size and a location of an application window of a target application on a display screen of a computer, the method comprising:

receiving a first user input identifying the target application, wherein the target application is not yet running;

initiating a window definition mode on said computer to enable an operating system to define the size and the location of the application window of the target application prior to receiving a second user input, wherein while said computer is in this mode, a geometric shape drawn on said display screen over an application window is not handled by the application associated with said application window, but by the operating system;

receiving by the operating system the second user input comprising a geometric shape drawn on said display screen, said geometric shape drawn by a user with a touch input device, wherein the geometric shape comprises a rectangle, and wherein the geometric shape is drawn on any portion of the display screen which includes an area inside at least one application window and outside of the at least one application window, the second user input comprising the rectangle drawn on the display screen with said touch input device before said first user input is received, the second user input further comprising an application name written inside said rectangle by the user;

determining by the operating system the size and the screen location of an application window based on said geometric shape, wherein said determining comprises selecting a size and a screen location for the application window based on the size and the screen location of said rectangle; and establishing and operating the target application by the operating system in said application window on the display screen.

13. The method of claim 12, wherein said establishing comprises receiving a user input symbol inside borders of the geometric shape, interpreting the user input symbol by identifying an application associated with the user input symbol, and instantiating the application on said computer and associating the application with the application window on the display screen.

14. The method of claim 1, wherein the window definition mode is initiated based on a type of the geometric shape drawn on any portion of the display screen.

15. The method of claim 1, wherein the window definition mode is initiated based on an extent to which the geometric shape overlaps with the at least one application window.

* * * * *